(12) United States Patent
Zhang et al.

(10) Patent No.: US 8,208,692 B2
(45) Date of Patent: Jun. 26, 2012

(54) METHOD AND SYSTEM FOR IDENTIFYING A PERSON USING THEIR FINGER-JOINT PRINT

(75) Inventors: Lei Zhang, Hong Kong (HK); Lin Zhang, Hong Kong (HK); Hailong Zhu, Hong Kong (HK); David Zhang, Hong Kong (HK); Nan Luo, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 768 days.

(21) Appl. No.: 12/354,537

(22) Filed: Jan. 15, 2009

(65) Prior Publication Data

US 2010/0177937 A1 Jul. 15, 2010

(51) Int. Cl.
*G06K 9/00* (2006.01)
(52) U.S. Cl. ......... 382/115; 382/195; 382/125; 382/118
(58) Field of Classification Search .................. 382/125, 382/115, 195, 118
See application file for complete search history.

(56) References Cited

U.S. PATENT DOCUMENTS

| | | | |
|---|---|---|---|
| 3,576,537 A | 4/1971 | Ernst | |
| 3,576,538 A | 4/1971 | Miller | |
| 3,581,282 A | 5/1971 | Altman | |
| 3,648,240 A | 3/1972 | Jacoby et al. | |
| 4,032,889 A | 6/1977 | Nassimbene | |
| 4,736,203 A | 4/1988 | Sidlauskas | |
| 5,862,246 A * | 1/1999 | Colbert | 382/115 |
| 6,097,035 A | 8/2000 | Belongie et al. | |
| 6,314,197 B1 | 11/2001 | Jain et al. | |
| 6,411,728 B1 | 6/2002 | Lee et al. | |
| 6,763,127 B1 | 7/2004 | Lin et al. | |
| 7,190,816 B2 | 3/2007 | Mitsuyu et al. | |
| 2004/0057604 A1 | 3/2004 | David et al. | |
| 2006/0120576 A1 | 6/2006 | Chen | |
| 2007/0230754 A1 | 10/2007 | Jain et al. | |

OTHER PUBLICATIONS

Wang et al: "A Novel Biometrics Technology—Finger-back Articular Skin Texture Recognition", ACTA Automatica Sinica, vol. 32, No. 3, 2006.*

D. Zhang, W. K. Kong, J. You, and M. Wong, "Online palmprint identification", IEEE Trans. Pattern Anal. Mach. Intell., vol. 25, No. 9, pp. 1041-1050, Sep. 2003.

A.K. Jain, A. Ross, S. Pankanti, "A prototype hand geometry-based verification system", in: Proc. of 2nd Internat. Conf. on Audio- and Video-based Biometric Person Authentication (AVBPA), Washington DC, Mar. 1999, pp. 166-171.

(Continued)

*Primary Examiner* — Matthew Bella
*Assistant Examiner* — Ruiping Li
(74) *Attorney, Agent, or Firm* — Muncy, Geissler, Olds & Lowe, PLLC

(57) ABSTRACT

A method for identifying a person using their finger-joint print including the outer skin around the proximal interphalangeal joint of a finger, the method comprising: capturing (10) an image of the finger-joint print of the person; extracting (12) a region of interest (ROI) based on a local convexity property of the finger-joint print; extracting (13) features representing the orientation of the lines in a finger-joint print image from the ROI using an extended Gabor phase coding scheme and the extracted features are represented in competitive code maps; wherein angular distance between the competitive code maps is compared (14) with a reference set in a database to identify the person.

10 Claims, 7 Drawing Sheets

OTHER PUBLICATIONS

R. Sanchez-Reillo, C. Sanchez-Avila, A. Gonzalez-Marcos, "Biometric identification through hand geometry measurements", IEEE Trans. Pattern Anal. Mach. Intell. 22 (10). (2000) 1168-1171.

A.K. Jain, N. Duta, Deformable matching of hand shapes for verification, in: Proc. Internat. Conf. on Image Processing, Oct. 1999, pp. 857-861.

R.F. Luo, T.S. Lim, "Finger crease pattern recognition using Legendre moments and principal component analysis", Chinese Optics Letters, vol. 5, issue. 3, pp. 160-163, 2007.

D. G. Joshi, Y. V. Rao, S. Kar, Valli Kumar and R. Kumar, "Computer-vision-based approach to personal identification using finger crease pattern", Pattern Recognition, vol. 31, No. 1, pp. 15-22, 1998.

Damon L. Woodard, Patrick J. Flynn, "Finger surface as a biometric identifier", Computer Vision and Image Understanding, vol. 100, pp. 357-384,100, 2005.

Adams Wai-Kin Kong, David Zhang, "Competitive coding scheme for palmprint verification", in Proceeding of International Conference on Pattern Recognition, (ICPR) Aug. 23-26, Cambridge, UK, vol. 1, pp. 520-523, 2004.

T.S. Lee, "Image representation using 2D Gabor wavelet", IEEE Trans. on PAMI, vol. 18, No. 10, pp. 957-971, 1996.

A.K. Jain, S. Prabbhakar, L. Hong and S. Pankanti, "Filterbank-based fingerpring matching", IEEE Transaction on Image Processing, vol. 9, No. 5, pp. 846-859, 2000.

C. Ravikanth and A. Kumar, "Biometric Authentication using Finger-Back Surface", proceedings of CVPR07, pp. 1-6, 2007.

C. Wang, S. Song, F. Sun and L. Mei, "Study on Finger-Articular Back Texture Recognition", proceedings of ICSP08, pp. 2085-2091, 2008.

* cited by examiner

30

40

50

60

61

70  71

80

METHOD AND SYSTEM FOR IDENTIFYING A PERSON USING THEIR FINGER-JOINT PRINT

TECHNICAL FIELD

The invention concerns a method and system for identifying a person using their finger-joint print including the outer skin around the proximal interphalangeal joint of a finger.

BACKGROUND OF THE INVENTION

Personal identification has numerous applications such as physical access control, computer security and law enforcement. Biometric based personal identification is regarded as an effective method for automatically recognizing a person's identity with a high confidence. Biometrics are physiological or behavioral characteristics used to distinguish between individuals which can serve as a superior solution to this problem. Many systems have been developed based on various biometric characteristics. Biometrics systems have been developed based on different kinds of biometrics, including face, iris, fingerprint, palm-print, voice and signature. Each biometric identifier has its own characteristics and application domains and none of them can supersede all the others under every circumstance. For example, although fingerprint identification has been widely used for many years and works well in most cases, it has its own drawbacks including difficulty to acquire fingerprint features. For some types of people, such as labor workers and the elderly, the inner parts of the hands can be easily abraded that will seriously affect the performance of fingerprint, palmprint, or finger basal creases based systems. Iris based systems can achieve extremely high accuracy, however, iris scanners are very expensive. Palm print based systems must have a large size acquisition device. As a result, new kinds of systems based on various biometric identifiers are still developing.

Therefore there is a desire for a biometric method and system that addresses some of the problems identified.

SUMMARY OF THE INVENTION

In a first preferred aspect, there is provided a method for identifying a person using their finger-joint print including the outer skin around the proximal interphalangeal joint of a finger, the method comprising:

capturing an image of the finger-joint print of the person;

extracting a region of interest (ROI) image $I_{ROI}$ based on a local convexity property of the finger-joint print;

extracting features representing the orientation of the lines in a finger-joint print image from the ROI image $I_{ROI}$ using an extended Gabor phase coding scheme and the extracted features are represented in competitive code maps;

wherein angular distance between the competitive code maps is compared with a reference set in a database to identify the person.

The method may further comprise the initial step of placing the finger onto a triangular block.

The method may further comprise defining a ROI coordinate system to extract the ROI image $I_{ROI}$ by:

cropping a coarse sub-image $I_{coarse}$ from the captured image;

obtaining a corresponding edge image $I_{edge}$ from the coarse sub-image $I_{coarse}$ using a canny edge detector;

coding the corresponding edge image $I_{edge}$ based on a local convexity property to obtain a convexity coding image $I_{cc}$, such that each pixel on the corresponding edge image $I_{edge}$ is assigned a code to represent the local convexity of this pixel;

obtaining a line $X=x_o$ to best classify "−1" and "1" pixels on the convexity image $I_{cc}$; and taking the line $X=x_o$ as the Y-axis of the ROI coordinate system and the line $$y = \frac{\text{height of } I_{coarse}}{2}$$

as the X-axis.

The formula to obtain $x_o$ may be:

$$x_0 = \arg\min_x \left( \frac{\text{num of "1" pixels on the right of } X=x}{\text{num of "1" pixels}} + \frac{\text{num of "−1" pixels on the left of } X=x}{\text{num of "−1" pixels}} \right)$$

A real part $G_R$ of a neurophysiology-based Gabor filter may be applied to the ROI image $I_{ROI}$ to extract the orientation information of the ROI image $I_{ROI}$.

The orientation information may be represented in a competitive code map defined by:

$$compCode(x, y) = \arg\max_j \{abs(I_{ROI}(x, y) * G_R(x, y, \omega, \theta_j))\}, j = \{0, \ldots, 5\}$$

where * represents the convolution operation and $G_R$ represents the real part of neurophysiology-based Gabor function G.

The angular distance D(P,Q) may be defined by the following equation:

$$D(P, Q) = \frac{\sum_{y=0}^{Rows} \sum_{x=0}^{Cols} (P_M(x,y) \cap Q_M(x,y)) \times G(P(x,y), Q(x,y))}{3 \sum_{y=0}^{Rows} \sum_{x=0}^{Cols} P_M(x,y) \cap Q_M(x,y)}$$

where $$G(P(x,y), Q(x,y)) = \begin{cases} 1, P(x,y)=6 \text{ and } Q(x,y) \neq 6 \\ 1, P(x,y) \neq 6 \text{ and } Q(x,y)=6 \\ 0, P(x,y)=Q(x,y) \\ \min(P(x,y)-Q(x,y), Q(x,y)-(P(x,y)-6)), \\ \quad \text{if } P(x,y) > Q(x,y) \text{ and } P(x,y) \neq 6 \\ \min(Q(x,y)-P(x,y), P(x,y)-(Q(x,y)-6)), \\ \quad \text{if } P(x,y) < Q(x,y) \text{ and } Q(x,y) \neq 6 \end{cases}$$

and ∩ denotes an AND operator.

An A* path-finding searching algorithm may be used to provide an approximate optimal solution to match the extracted features stored as competitive code maps.

In a second aspect, there is provided a system for identifying a person using their finger-joint print including the outer skin around the proximal interphalangeal joint of a finger, the method comprising:

an image capture device to capture an image of the finger-joint print of the person;

a first extraction module to extract a region of interest (ROI) image $I_{ROI}$ based on a local convexity property of the finger-joint print;

a second extraction module to extract features representing the orientation of the lines in a finger-joint print image from the ROI image $I_{ROI}$ using an extended Gabor phase coding scheme and the extracted features are represented in competitive code maps;

wherein angular distance between the competitive code maps is compared with a reference set in a database to identify the person.

The system may further comprise a triangular block for placement of the finger.

The present invention is a standalone system that advantageously uses the 2D finger-joint print features for personal identification. Through rigid experiments, this new biometric identifier has the properties of uniqueness and stability, which make it a very good biometric characteristic for personal identification.

The present invention advantageously operates in real-time and achieves a high recognition rate that is comparable to other biometric systems, such as fingerprint recognition system.

The present invention is more user friendly than other kinds of systems, such as fingerprint recognition system. The imaging of the present invention is touchless and unlike fingerprint imaging, no imprint will be left.

The present invention has a small form factor compared to some existing biometric systems, such as a palmprint recognition system. This means it can be easily deployed in many applications.

The present invention is very cost effective and can achieve high performance comparable to other popular biometric systems.

The present invention is more suitable than other biometric systems in some specific applications. For example, compared with the fingerprint or palmprint recognition systems, the present invention is more suitable for labor workers. The inner surface of these workers' hands may suffer severe abrasion and therefore fingerprint or palmprint recognition systems are unsuitable.

BRIEF DESCRIPTION OF THE DRAWINGS

An example of the invention will now be described with reference to the accompanying drawings, in which.

DETAILED DESCRIPTION OF THE DRAWINGS

Figure 1:
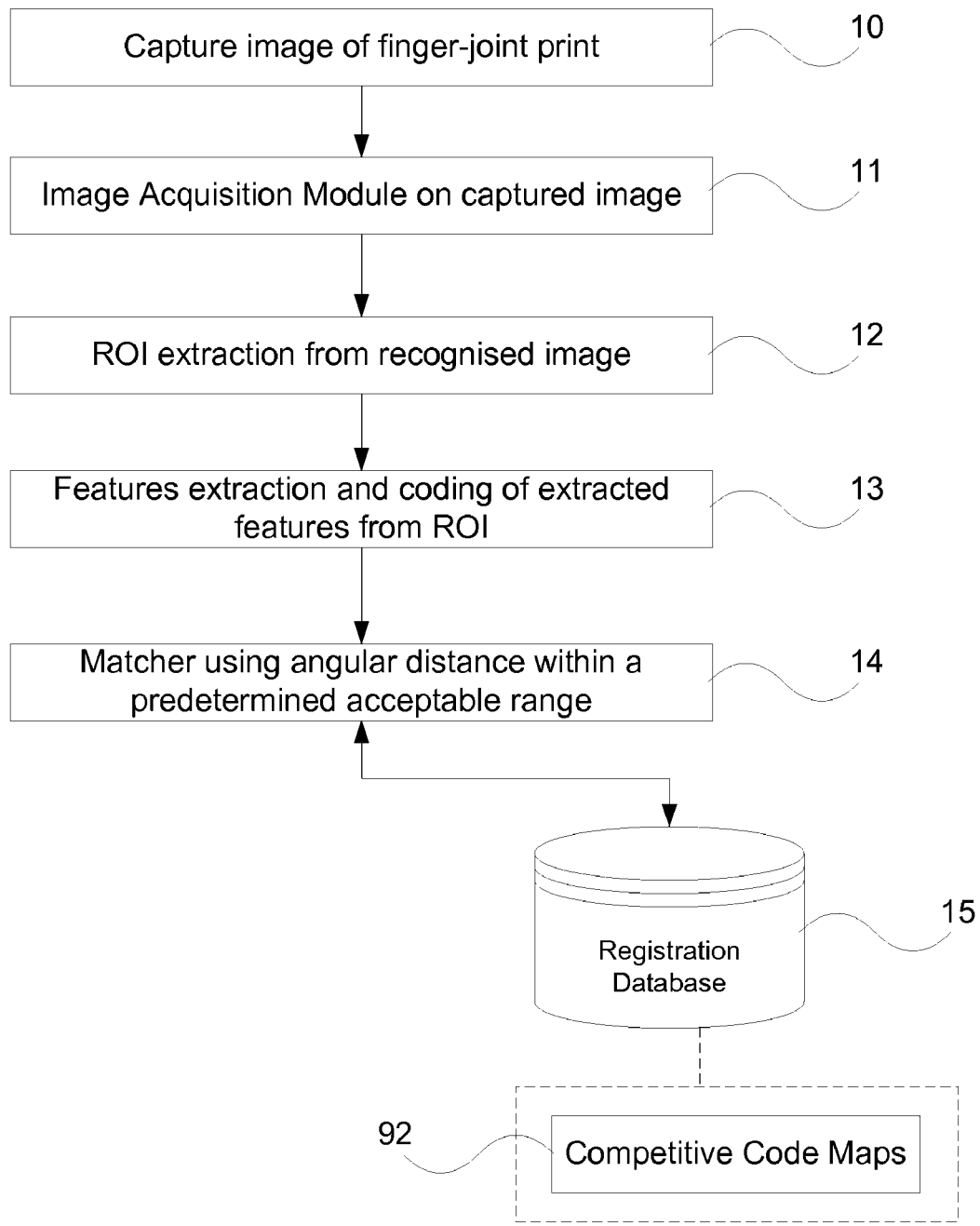
FIG. 1 is a process flow diagram for matching a finger-joint print in accordance with a preferred embodiment of the present invention.

Referring to FIG. 1, a personal identification system 18 is provided that is based on a two-dimensional (2D) finger-joint print. The finger-joint print refers to the outer skin around the proximal interphalangeal joint of a finger. The system 18 generally comprises two parts: a finger-joint print image acquisition device 19 to capture the finger-joint print image of a person, and a software module 27 to process the captured image for personal identification.

The process of the software module 27 includes: registering and matching finger-joint print images. When registering a finger-joint print, an image of the finger-joint print is captured 10. The finger-joint print image is acquired 11 and then the Region of Interest (ROI) image $I_{ROI}$ is extracted 12 with an extraction algorithm based on the local convexity property of the finger-joint print. The features representing the orientation of the lines in a finger-joint print image is extracted 13 from the ROI image $I_{ROI}$ based on the extended Gabor phase coding scheme. The extracted features are represented in competitive code maps 92 and stored in a database 15. Another feature is retrieved from the newly acquired image and is searched against images previously stored in the database 15 to obtain angular distances during matching. To determine if there is match, the angular distances are compared 14. If the angular distance is zero a perfect match is found. However, if the angular distance is within a predetermined acceptable range, then this may also be considered a match.

Finger-Joint Print Image Acquisition Device

Figure 2:
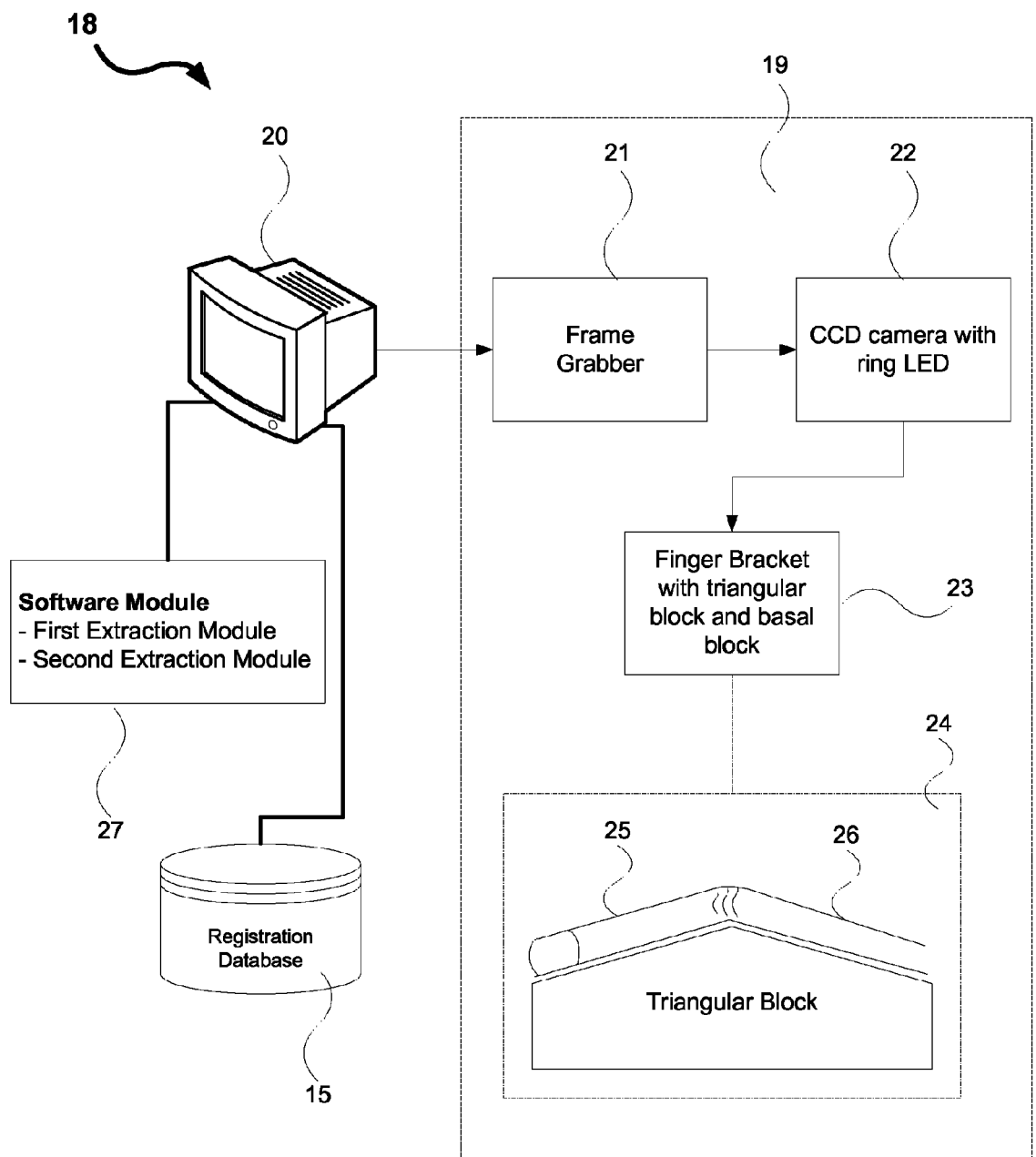
FIG. 2 is a structural diagram of a finger-joint print identification system.

Referring to FIG. 2, the finger-joint print image acquisition device 19 generally comprises a finger bracket 24, a ring LED light source, a lens, a common CCD camera 22 and a frame grabber 21. The frame grabber 21 is an electronic device that captures individual, digital still frames from the CCD camera 22. To obtain a stable finger-joint print image, a case is provided for the finger bracket 24 to form a semi-closed environment. The finger bracket 24 is used to control the pose of the finger. The device 19 ensures that the pose of the same finger does not significantly vary between different capturing sessions in order to simplify the recognition methods. The finger bracket 2 has a triangular block 24 which constrains the angle between the proximal phalanx 26 and the middle phalanx 25 to a certain magnitude.

Figure 3:
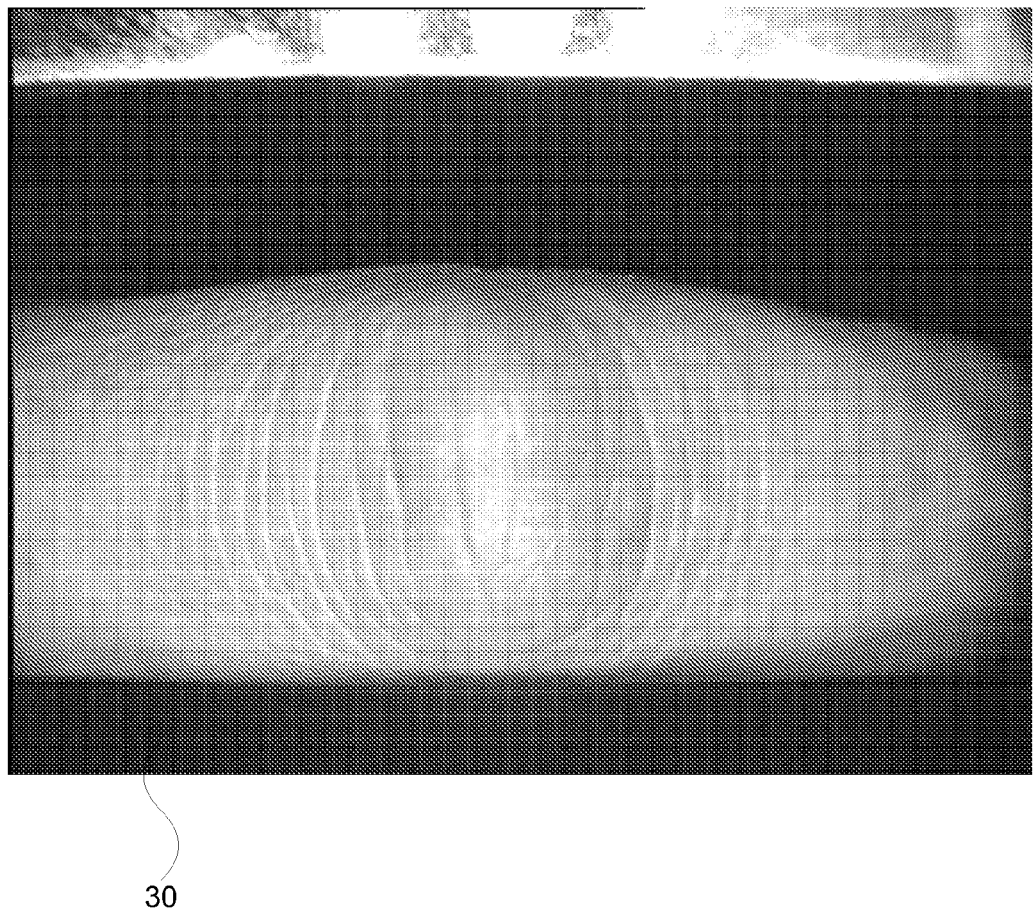
FIG. 3 is a sample image captured by an image capture device of the system of FIG. 2.

When capturing an image of the finger-joint, the user is instructed to place their finger flat on the basal block of the finger bracket 23 and to make the middle phalanx 25 and the proximal phalanx 26 close against the two slopes of the triangular block 23. The angle between the middle phalanx 25 and the proximal phalanx 26 is approximately the same as that formed by the two slopes of the triangular block 23. After the image is captured by the CCD camera 22 and frame grabber 21, it is transmitted to the computer 20 for further processing by the software module 27. FIG. 3 shows a sample image 30 acquired by the device 19.

ROI Image Extraction from Finger-Joint Print Images

In the software module 27, an ROI coordinate system is defined that is able to align different finger-joint print images for matching. For reliable feature measurements, an algorithm determines the ROI coordinate system. The ROI images are extracted using the ROI coordinate system. The X-axis of the ROI coordinate system is relatively easily identified while the Y-axis presents some difficulty. The "skin curves" on the two sides of the proximal interphalangeal joint have different convexity properties. The details of the ROI image extraction process are described.

A "coarse" sub-image $I_{coarse}$ 40 is cropped from the original image 30.

Figure 4:
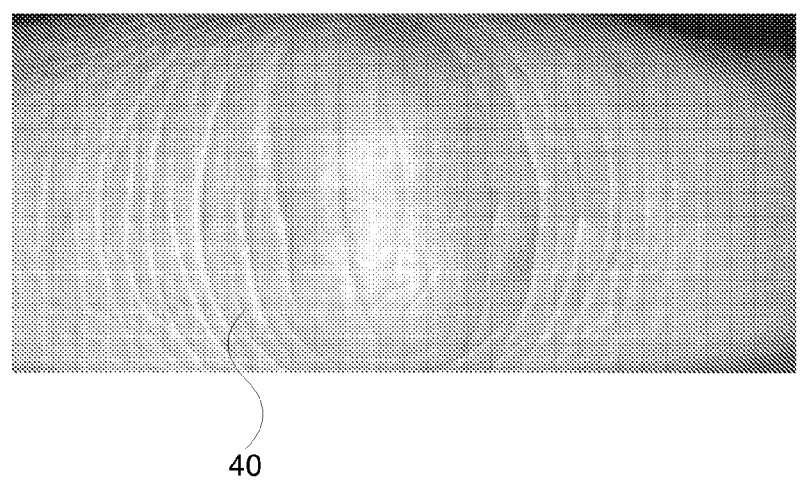
FIG. 4 is a coarse sub-image $I_{coarse}$ for the sample image of FIG. 3.

Useful pixels only occupy a part of the image acquired that corresponds to a "real" finger. The coarse sub-image $I_{coarse}$ 40 is cropped from the original image 30 for the convenience of subsequent processing. The left and right boundaries of the "coarse" sub-image $I_{coarse}$ 40 are evaluated by experience. The top and bottom boundaries are evaluated according to the boundary of the "real" finger. The boundaries are obtained using a method such as a canny edge detector. The corresponding coarse sub-image $I_{coarse}$ 40 of the sample image 30 is depicted in FIG. 4.

Figure 5:
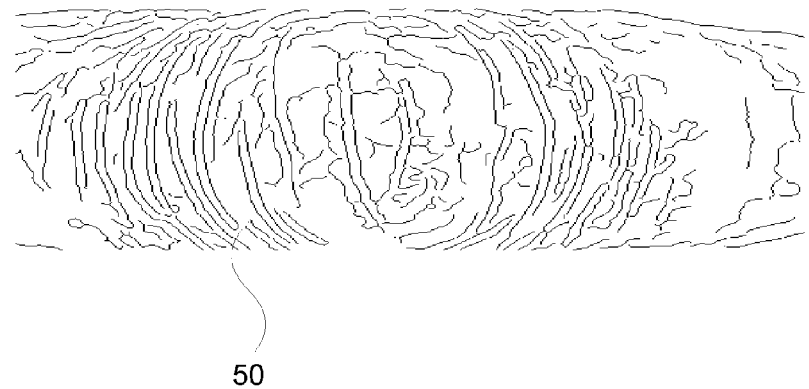
FIG. 5 is an edge image $I_{edge}$ for the coarse sub-image $I_{coarse}$ of FIG. 4.

A corresponding edge image $I_{edge}$ 50 is obtained for the coarse sub-image $I_{coarse}$ 40 using a canny edge detector. The corresponding edge image $I_{edge}$ 50 for the coarse sub-image $I_{coarse}$ 40 is depicted in FIG. 5.

Figure 6A:
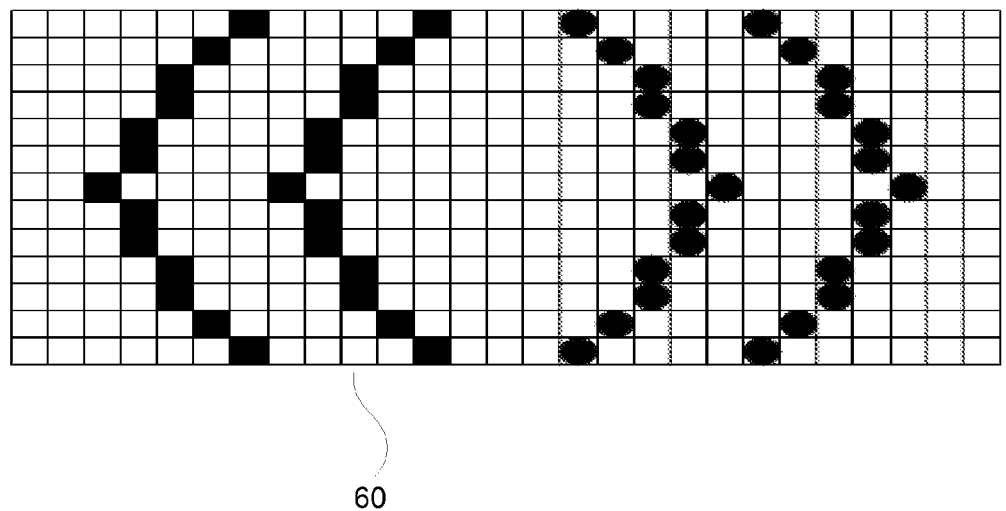
FIGS. 6(a) and (b) illustrate a convex direction coding scheme.
Figure 6B:
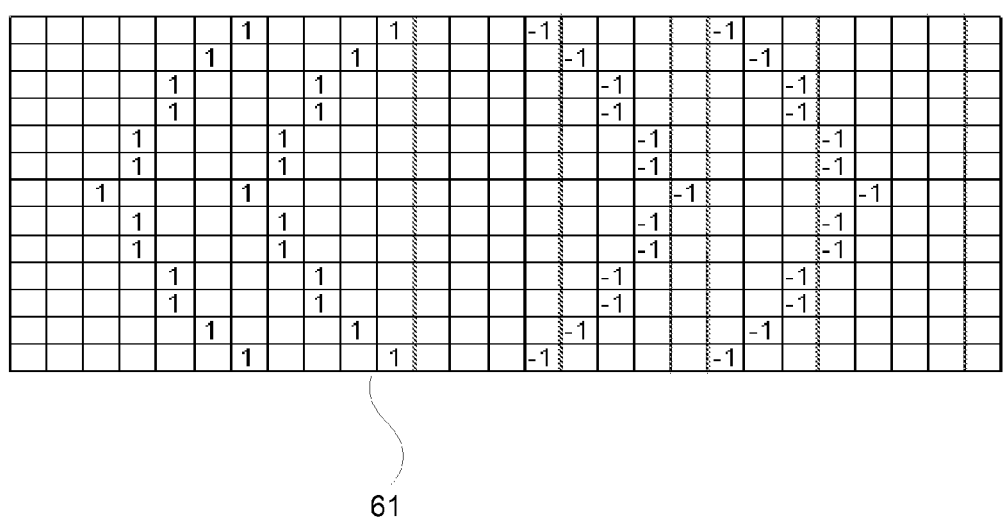

The corresponding edge image $I_{edge}$ 50 is convex direction coded based on a local convexity property to obtain a convexity coding image $I_{cc}$ illustrated by FIG. 6(*b*). Each pixel of the corresponding edge image $I_{edge}$ 50 is given a code to represent the local convexity of this pixel. The underling principle of this coding scheme is as follows. Based on the observation of finger-joint print images, an ideal model for "curves" on an finger-joint print image is abstracted as shown in FIG. 6(*a*). In this model, a finger-joint print "curve" is either convex leftward (squared points in FIG. 6(*a*) or convex rightward (circle points in FIG. 6(*a*)). A pixel on a convex leftward curve is given a code "1"; a pixel on a convex rightward curve is given a code "−1", and the other pixels not on any curves are coded as "0". The present invention regards the edges in $I_{edge}$ as "curves" and this convex direction coding is performed on ledge FIG. 6(*b*) illustrates the coding result for FIG. 6(*a*).

The algorithm is:

$$y_{mid} = \frac{\text{height of } I_{edge}}{2};$$

initialize $I_{cc}$ with the same size as $I_{edge}$ and assign each pixel a value zero;
scan each pixel on $I_{edge}$, from left to right, from top to down:
    for the current pixel $I_{edge}(i, j)$
    // i,j represents the row and column of the current pixel in the image $I_{edge}$
        if $I_{edge}(i,j) == 0$ // it is a background pixel
            ignore it;
        else if $I_{edge}(i+1,j-1) == 1$ and $I_{edge}(i+1,j+1) == 1$ // it is a bifurcation pixel
            ignore it;
        else if $(I_{edge}(i+1,j-1) == 1$ and $i <= y_{mid})$ or $(I_{edge}(i+1,j+1) == 1$ and $i > y_{mid})$
            $I_{cc}(i,j) = 1$;
        else if $(I_{edge}(i+1,j+1) == 1$ and $i <= y_{mid})$ or $(I_{edge}(i+1,j-1) == 1$ and $i > y_{mid})$
            $I_{cc}(i,j) = -1$;

The convexity coding image $I_{cc}$ illustrated by FIG. 6(*b*) is obtained which reflects the local convexity property of the "curves" on the original finger-joint print image. Most of the "1" pixels lie on the left part of the convexity coding image $I_{cc}$ while most of the "−1" ones lie on the right part FIG. 6(*b*). A line $X = x_0$ is obtained that can best classify "−1" and "1" pixels on the convexity coding image $I_{cc}$. The line $X = x_0$ that can best classify "1" and "−1" pixels is fitted in the convexity coding image $I_{cc}$ into left and right parts. The formula to obtain $x_0$ is:

$$x_0 = \operatorname*{argmin}_{x}\left(\frac{\text{num of "1" pixels on the right of } X = x}{\text{num of "1" pixels}} + \frac{\text{num of "−1" pixels on the left of } X = x}{\text{num of "−1" pixels}}\right)$$

Figure 7:
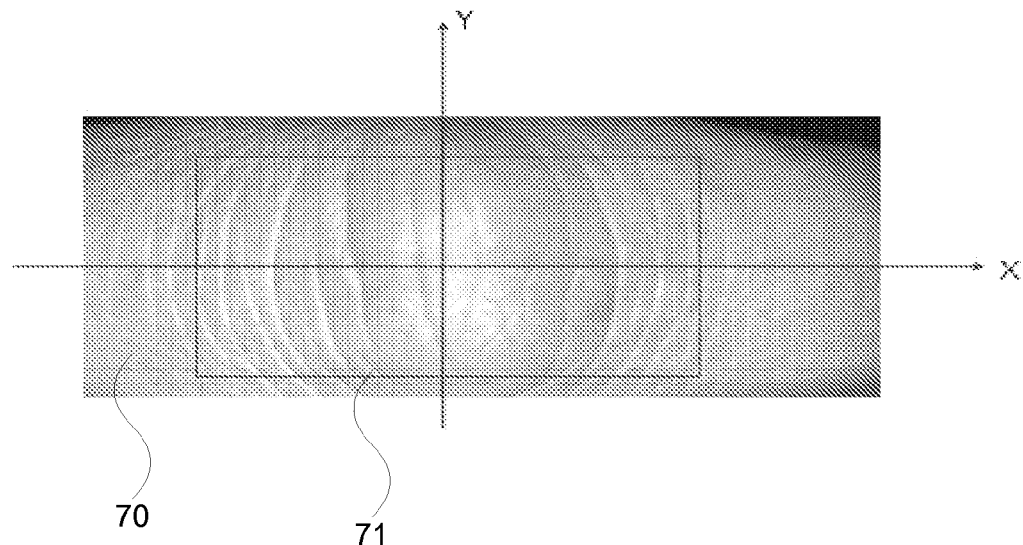
FIG. 7 is a Region of Interest (ROI) coordinate system for the coarse sub-image $I_{coarse}$ of FIG. 4 where the rectangle indicates the ROI area corresponding to the coarse sub-image $I_{coarse}$ that is to be extracted.
Figure 8:
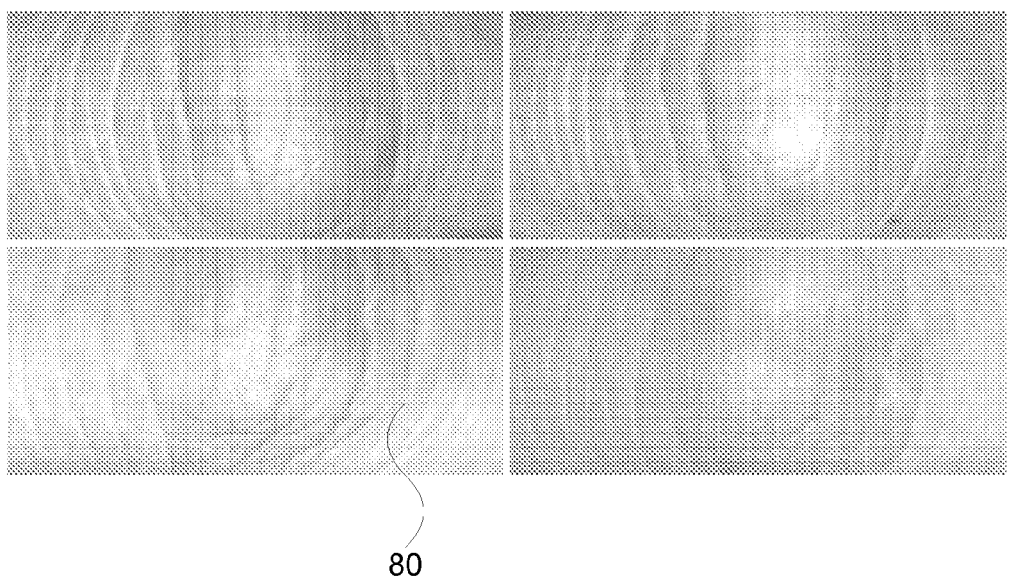
FIG. 8 is a set of examples of the ROI images.

The line $X = x_0$ is taken as the Y-axis of the ROI coordinate system and the line $$y = \frac{\text{height of } I_{coarse}}{2}$$

as the X-axis. A ROI image $I_{ROI}$ of a fixed size is extracted from $I_{coarse}$ under this coordinate system. FIG. 7 illustrates the ROI coordinate system set up for the coarse sub-image $I_{coarse}$ 40 shown in FIG. 4. In FIG. 7, the rectangle 71 indicates the area of the ROI image $I_{ROI}$ that will be extracted. FIG. 8 shows some examples of ROI images extracted by the method described above.

Feature Extraction and Coding

There are abundant line features in the finger-joint print image. A Gabor function based competitive coding scheme extracts the features of interest. A circular Gabor filter is an effective tool for texture analysis. The formula is:

$$G(x, y, \omega, \theta) = \frac{\omega}{\sqrt{2\pi}\,\kappa} e^{-\frac{\omega^2}{8\kappa^2}(4x'^2+y'^2)} \left(e^{i\omega x'} - e^{-\frac{\kappa^2}{2}}\right)$$

where $x'=(x-x_0)\cos\theta+(y-y_0)\sin\theta$, $y'=-(x-x_0)\sin\theta+(y-y_0)\cos\theta$; $(x_0, y_0)$ is the center of the function; $\omega$ is the radial frequency in radians per unit length and $\theta$ is the orientation of the Gabor functions in radians. The $\kappa$ is defined by $$\kappa = \sqrt{2\ln 2}\left(\frac{2^\delta + 1}{2^\delta - 1}\right),$$

where $\delta$ is the half-amplitude bandwidth of the frequency response. When $\sigma$ and $\delta$ are fixed, $\omega$ can be derived from $\omega = \kappa/\sigma$. This Gabor function is referred to as a neurophysiology-based Gabor function. It is the same as the general Gabor functions but the choices of parameters is limited by neurophysiological findings and the DC (direct current) of the functions are removed.

To extract the orientation information of the ROI image $I_{ROI}$, the real part of the neurophysiology-based Gabor filter is applied to it. At each pixel $I_{ROI}(x,y)$, Gabor responses $R_j = I_{ROI}(x,y) * G_R(x,y,\omega,\theta_j)$ are calculated at six different orientations $\theta_j = j\pi/6$, $j = \{1, \ldots 5\}$. * represents the convolution operation while $G_R$ represents the real part of Gabor function G. The competitive code at this pixel is then defined as follows:

$$compCode(x, y) = \underset{j}{argmax}\{abs(I_{ROI}(x, y) * G_R(x, y, \omega, \theta_j))\}$$

The algorithm details are:
for each pixel $I_{ROI}(x,y)$ on the ROI image $I_{ROI}$:

---

$R = \{R_j = I_{ROI}(x,y) * G_R(x,y,\omega,\theta_j)\}$, where $\theta_j = j\pi / 6, j = \{0,1,...5\}$
if std(R) / (max(R) − min(R)) < threshod //this pixel does not have a definite orientatior
    compcode(x, y) = 6;
else $$compCode(x, y) = \underset{j}{arg\,max}\{abs(R_j)\}$$

---

Figure 9:
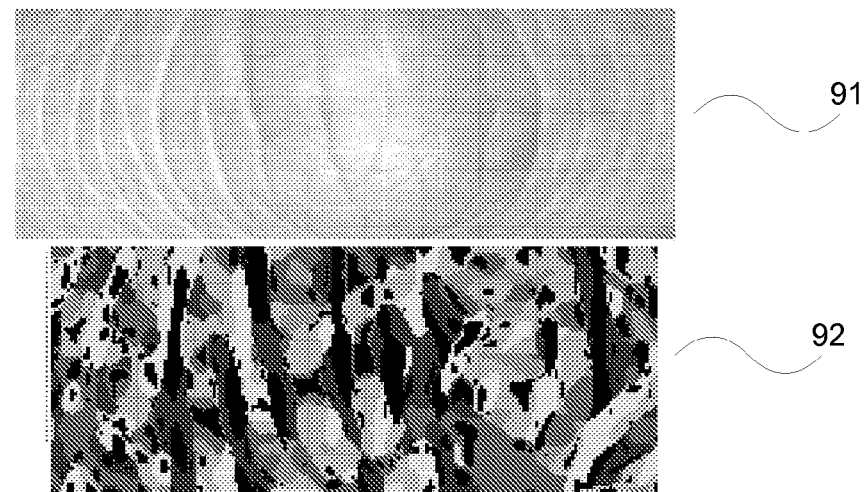
FIG. 9 is a set of images where the top image is a ROI image $I_{ROI}$ and the bottom image is its competitive code map.

The competitive code map 92 is also stored in a matrix form. FIG. 9 shows an example of a ROI image $I_{ROI}$ 91 and its corresponding competitive code map 92 obtained with the algorithm described above.

Matching Competitive Codes

Given two competitive code representation of two finger-joint prints, a matching algorithm determines the degree of similarity between them. Angular distances are employed to compare them. Let P and Q be the two feature matrices (competitive code maps 92) and $P_M$ and $Q_M$ be the corresponding masks used for indicating the overlapping areas when one of the features is translated. Angular distance D(P, Q) is defined by the following equation:

$$D(P, Q) = \frac{\sum_{y=0}^{Rows}\sum_{x=0}^{Cols}(P_M(x, y) \cap Q_M(x, y)) \times G(P(x, y), Q(x, y))}{3\sum_{y=0}^{Rows}\sum_{x=0}^{Cols}P_M(x, y) \cap Q_M(x, y)}$$

where $$G(P(x, y), Q(x, y)) = \begin{cases} 1, P(x, y) = 6 \text{ and } Q(x, y) \neq 6 \\ 1, P(x, y) \neq 6 \text{ and } Q(x, y) = 6 \\ 0, P(x, y) = Q(x, y) \\ \min(P(x, y) - Q(x, y), Q(x, y) - (P(x, y) - 6)), \\ \quad \text{if } P(x, y) > Q(x, y) \text{ and } P(x, y) \neq 6 \\ \min(Q(x, y) - P(x, y), P(x, y) - (Q(x, y) - 6)), \\ \quad \text{if } P(x, y) < Q(x, y) \text{ and } P(x, y) \neq 6 \end{cases}$$

∩ denotes an AND operator. Taking into account the possible translations in the extracted sub-image (with respect to the one extracted during the enrolment), multiple matches are performed with one of the features translated in horizontal and vertical directions. The minimum of the resulting matching scores is considered to be the final angular distance.

In the majority of cases, the ROI images cannot be perfectly matched. When comparing the competitive codes, a range of translations is applied to obtain multiple matching distances and the minimal one is regarded as the final angular distance. This means that a minimal distance is searched for within a "translation space". It is very time consuming if this is directly performed over the competitive codes. Therefore a multi-scale matching scheme is used. At first, the pyramidal trees for the two competitive codes are constructed based on a down sampling operation. If the normal coarse-to-fine matching is used, for the majority of cases, it cannot provide an optimal solution. This is because when such a searching makes a bad choice of directions in the coarse-to-fine search, it can never backtrack no matter how large the error becomes at the fine scale levels. An A* (which is a path-finding algorithm fully developed in Artificial Intelligence) like searching algorithm is used which can provide an approximate optimal solution. The A* path-finding searching algorithm provides an approximate optimal solution to match the extracted features stored as competitive code maps 92.

Experiments and Results

In order to evaluate the system 18, rigorous experiments are performed on the specially acquired finger-joint print image database from 165 subjects. All images were acquired using the image capture device 22. The database 15 was populated. In the dataset, 125 people are male. In addition, the finger-joint print images were collected at two separate sessions. At each session, the subject was asked to provide six images, each of the left index finger, left middle finger, right index finger and right middle finger. Therefore, each person provided 48 images. The database 15 contains 7920 images from 660 different fingers. The average time interval between the first and second sessions was around 25 days.

Figure 10:
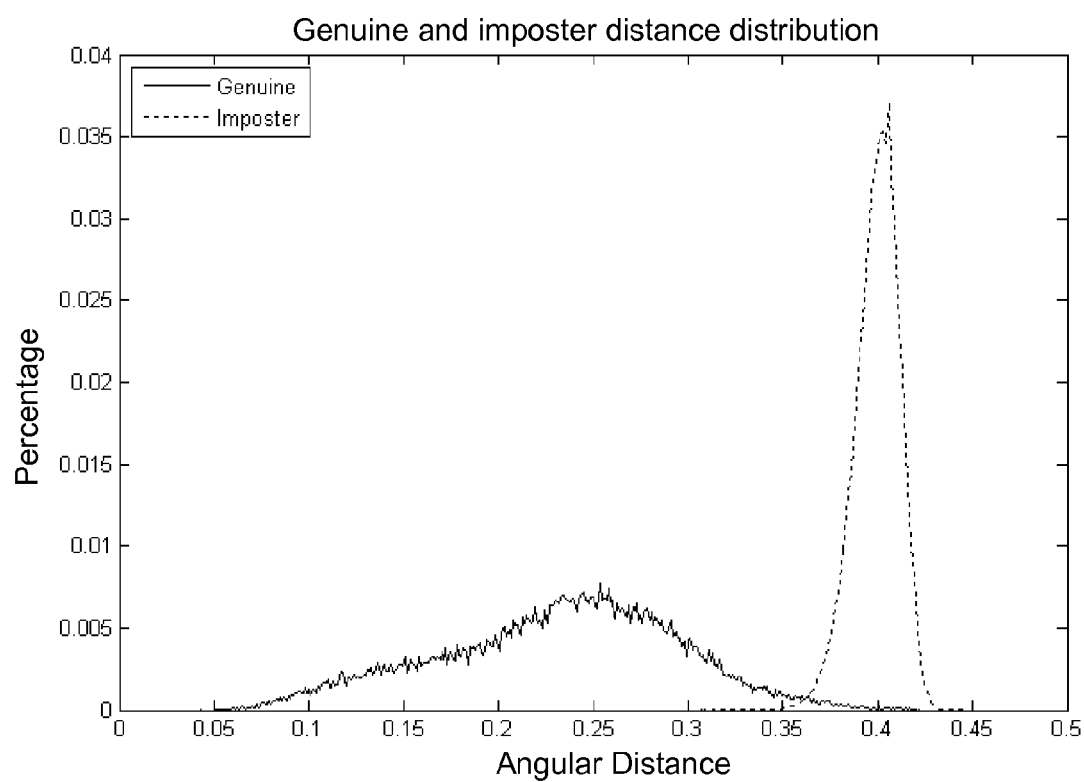
FIG. 10 is a chart illustrating the distribution of genuine and imposter distances.
Figure 11:
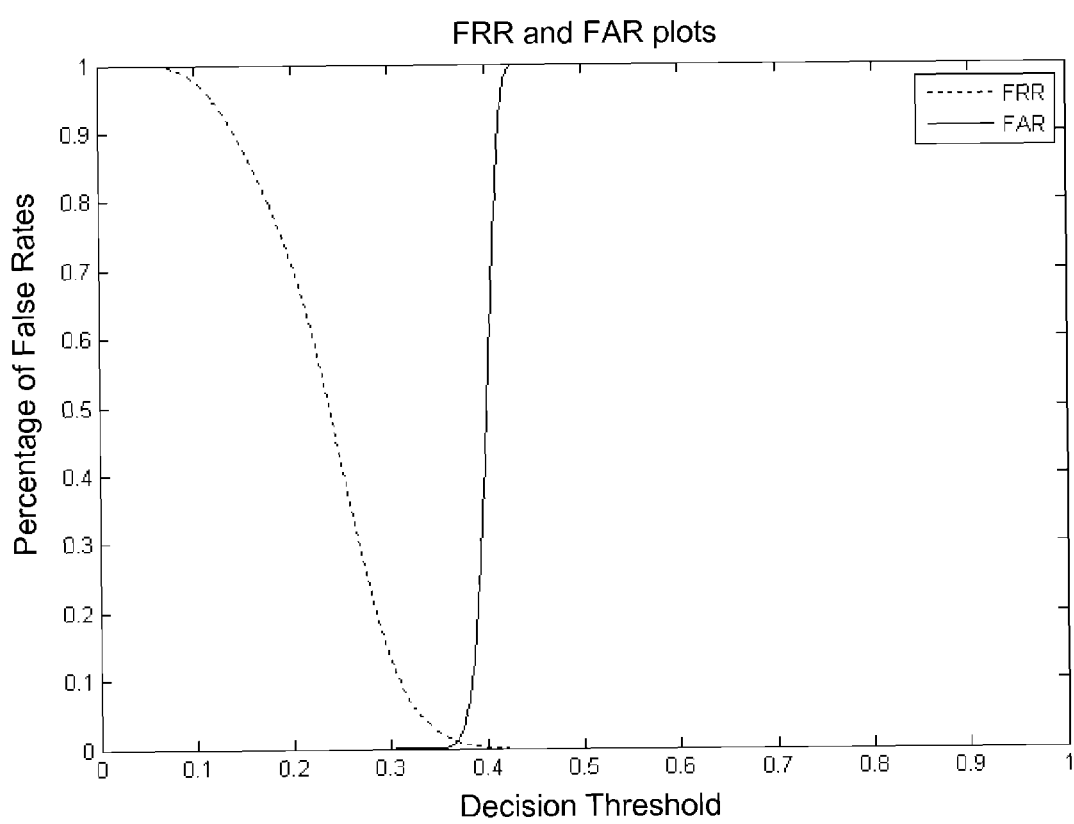
FIG. 11 is a chart illustrating the False Rejection Rate (FRR) and the False Acceptance Rate (FAR) plots.

To verify accuracy of the system 18, each finger-joint print image is matched with all the other images in the database 15. This resulted in 43,560 genuine and 31,359,240 imposter matching distances respectively. FIG. 10 shows the distribution of genuine and imposter matching distances. FIG. 11 shows the performance of the system, in terms of the FRR (false rejection rate) and the FAR (false acceptance rate) characteristics. The EER (equal error rate) obtained by the system is 1.13%, which is comparable with other hand-based biometrics, such as hand geometry, 3D finger surface and fingerprint.

The system 18 uses a 2D finger-joint print which has abundant line features as a biometric identifier. The system 18 is low cost system for real-time personal identification. The system 18 includes a novel CCD camera based finger-joint print image acquisition device 22 and an associated software processing system 27. A preprocessing algorithm extracts the ROI image $I_{ROI}$ from finger-joint print image for feature extraction. The use of a 2D Gabor filter based competitive coding is extended to represent a finger-joint print image using its texture feature. When matching, a normalized angular distance for the matching measurement is applied. The EER of the system is 1.13% using the current finger-joint print database 15 of 7,920 images from 660 different fingers. Experiments indicate that the system 10 can achieve comparable results with other hand-based biometrics, such as fingerprint, hand geometry or 3D finger surface. The system 18 may be used for personal identification or verification. If other biometrics based systems are not suitable, the system 18 is a viable and cost-effective alternative.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for identifying a person using their finger-joint print including the outer skin around the proximal interphalangeal joint of a finger, the method comprising:
    capturing an image of the finger-joint print of the person;
    extracting a region of interest (ROI) image $I_{ROI}$ based on a local convexity property of the finger-joint print;

extracting features representing the orientation of the lines in a finger-joint-print image from the ROI image $I_{ROI}$ using an extended Gabor phase coding scheme and the extracted features are represented in competitive code maps, wherein angular distance between the competitive code maps is compared with a reference set in a database to identify the person; and defining a ROI coordinate system to extract the ROI image $I_{ROI}$ by:
cropping a coarse sub-image $I_{coarse}$ from the captured image;
obtaining a corresponding edge image $I_{edge}$ from the coarse sub-image $I_{coarse}$ using a canny edge detector;
coding the corresponding edge image $I_{edge}$ based on a local convexity property to obtain a convexity coding image $I_{cc}$, such that each pixel on the corresponding edge image $I_{edge}$ is assigned a code to represent the local convexity of this pixel;
obtaining a line $X=x_0$ to best classify "−1" and "1" pixels on the convexity image $I_{cc}$; and
taking the line $X=x_0$ as the Y-axis of the ROI coordinate system and the line $$y = \frac{\text{height of } I_{coarse}}{2}$$

as the X-axis.

2. The method according to claim 1, further comprising the initial step of placing the finger onto a triangular block.

3. The method according to claim 1, wherein the formula to obtain $x_0$ is:

$$x_0 = \underset{x}{\operatorname{argmin}}\left(\frac{\text{num of "1" pixels on the right of } X = x}{\text{num of "1" pixels}} + \frac{\text{num of "−1" pixels on the left of } X = x}{\text{num of "−1" pixels}}\right).$$

4. The method according to claim 1, wherein a real part $G_R$ of a neurophysiology-based Gabor filter is applied to the ROI image $I_{ROI}$ to extract the orientation information of the ROI $I_{ROI}$.

5. The method according to claim 4, wherein the orientation information is represented in a competitive code map defined by:

$$compCode(x, y) = \underset{j}{\operatorname{argmax}}\{abs(I_{ROI}(x, y) * G_R(x, y, \omega, \theta_j))\}, j = \{0, \ldots, 5\}$$

where * represents the convolution operation and $G_R$ represents the real part of neurophysiology-based Gabor function G.

6. The method according to claim 1, wherein the angular distance D(P,Q) is defined by the following equation:

$$D(P, Q) = \frac{\sum_{y=0}^{Rows}\sum_{x=0}^{Cols}(P_M(x, y) \cap Q_M(x, y)) \times G(P(x, y), Q(x, y))}{3\sum_{y=0}^{Rows}\sum_{x=0}^{Cols} P_M(x, y) \cap Q_M(x, y)}$$

where $$G(P(x, y), Q(x, y)) = \begin{cases} 1, & P(x, y) = 6 \text{ and } Q(x, y) \neq 6 \\ 1, & P(x, y) \neq 6 \text{ and } Q(x, y) = 6 \\ 0, & P(x, y) = Q(x, y) \\ \min(P(x, y) - Q(x, y), Q(x, y) - (P(x, y) - 6)), \\ \quad \text{if } P(x, y) > Q(x, y) \text{ and } P(x, y) \neq 6 \\ \min(Q(x, y) - P(x, y), P(x, y) - (Q(x, y) - 6)), \\ \quad \text{if } P(x, y) < Q(x, y) \text{ and } Q(x, y) \neq 6 \end{cases}$$

and ∩ denotes an AND operator.

7. The method according to claim 1, wherein an A* path-finding searching algorithm is used to provide an approximate optimal solution to match the extracted features stored as competitive code maps.

8. A system for identifying a person using their finger-joint print including the outer skin around the proximal interphalangeal joint of a finger, the system comprising:
an image capture device to capture an image of the finger-joint print of the person;
a first extraction module to extract a region of interest (ROI) image $I_{ROI}$ based on a local convexity property of the finger-joint print; and
a second extraction module to extract features representing the orientation of the lines in a finger-joint print image from the ROI image $I_{ROI}$ using an extended Gabor phase coding scheme and the extracted features are represented in competitive code maps;
wherein angular distance between the competitive code maps is compared with a reference set in a database to identify the person, and
wherein the first extraction module is configured to define a ROI coordinate system to extract the ROI image $I_{ROI}$ by:
cropping a coarse sub-image $I_{coarse}$ from the captured image;
obtaining a corresponding edge image $I_{edge}$ from the coarse sub-image $I_{coarse}$ using a canny edge detector;
coding the corresponding edge image $I_{edge}$ based on a local convexity property to obtain a convexity coding image $I_{cc}$, such that each pixel on the corresponding edge image $I_{edge}$ is assigned a code to represent the local convexity of this pixel;
obtaining a line $X=x_0$ to best classify "−1" and "1" pixels on the convexity image $I_{cc}$; and
taking the line $X=x_0$ as the Y-axis of the ROI coordinate system and the line $$y = \frac{\text{height of } I_{coarse}}{2}$$

as the X-axis.

9. The system according to claim 8, further comprising a triangular block for placement of the finger.

10. A system for identifying a person using their finger-joint print including the outer skin around the proximal interphalangeal joint of a finger, the system comprising:
image capturing means for capturing an image of the finger-joint print of the person;
region extracting means for extracting a region of interest (ROI) image $I_{ROI}$ based on a local convexity property of the finger-joint print;

feature extracting means for extracting features representing the orientation of the lines in a finger-joint print image from the ROI image $I_{ROI}$ using an extended Gabor phase coding scheme and the extracted features are represented in competitive code maps;

comparing means for comparing angular distance between the competitive code maps with a reference set in a database to identify the person; and means for defining a ROI coordinate system to extract the ROI image $I_{ROI}$ by cropping a coarse sub-image $I_{coarse}$ from the captured image, obtaining a corresponding edge image $I_{edge}$ from the coarse sub-image $I_{coarse}$ using a canny edge detector, coding the corresponding edge image $I_{edge}$ based on a local convexity property to obtain a convexity coding image $I_{cc}$, such that each pixel on the corresponding edge image $I_{edge}$ is assigned a code to represent the local convexity of this pixel, obtaining a line $X=x_0$ to best classify "−1" and "1" pixels on the convexity image and taking the line $X=x_0$ as the Y-axis of the ROI coordinate system and the line $$y = \frac{\text{height of } I_{coarse}}{2}$$

as the X-axis.

* * * * *